Patented Jan. 27, 1925.

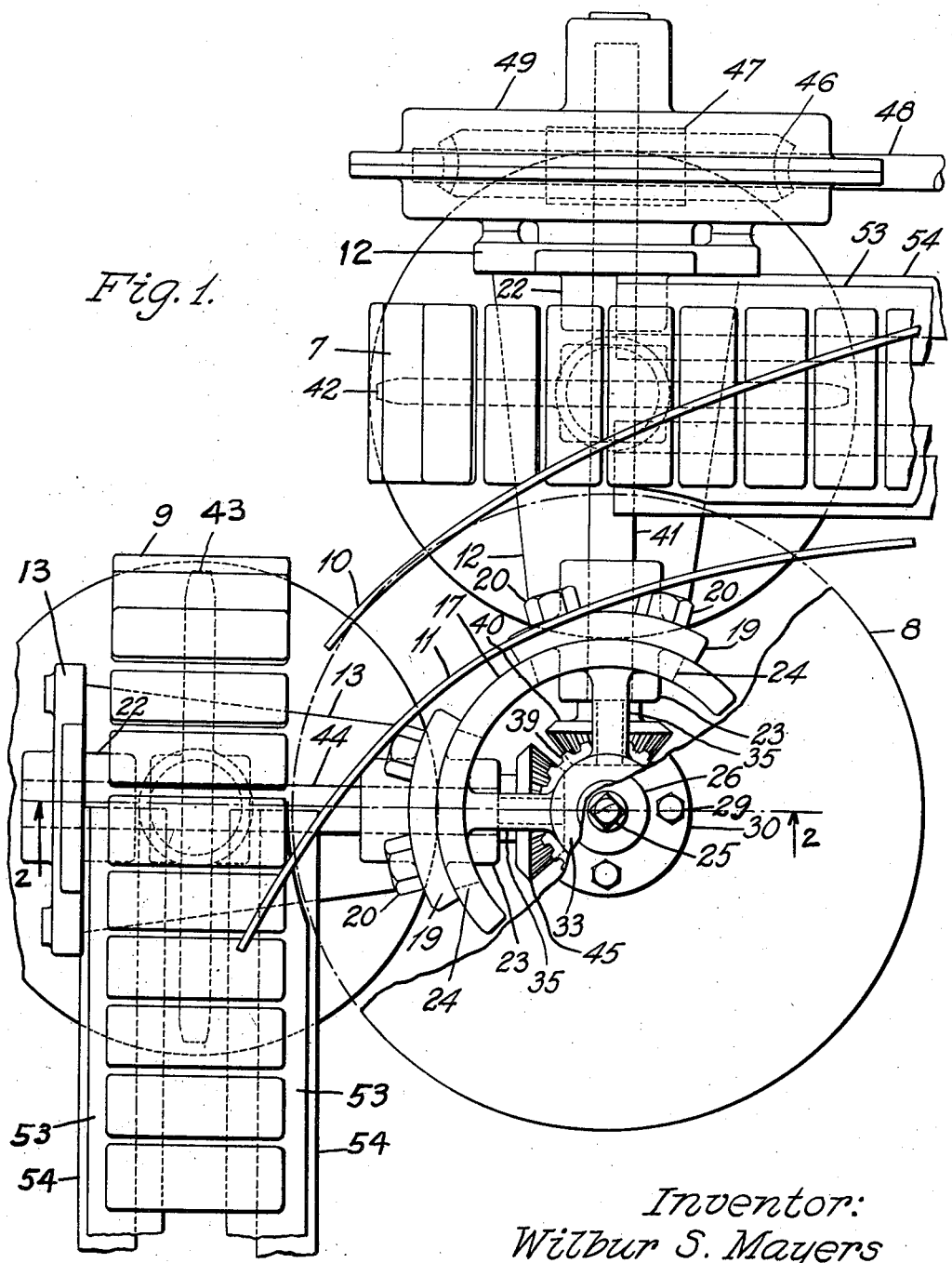

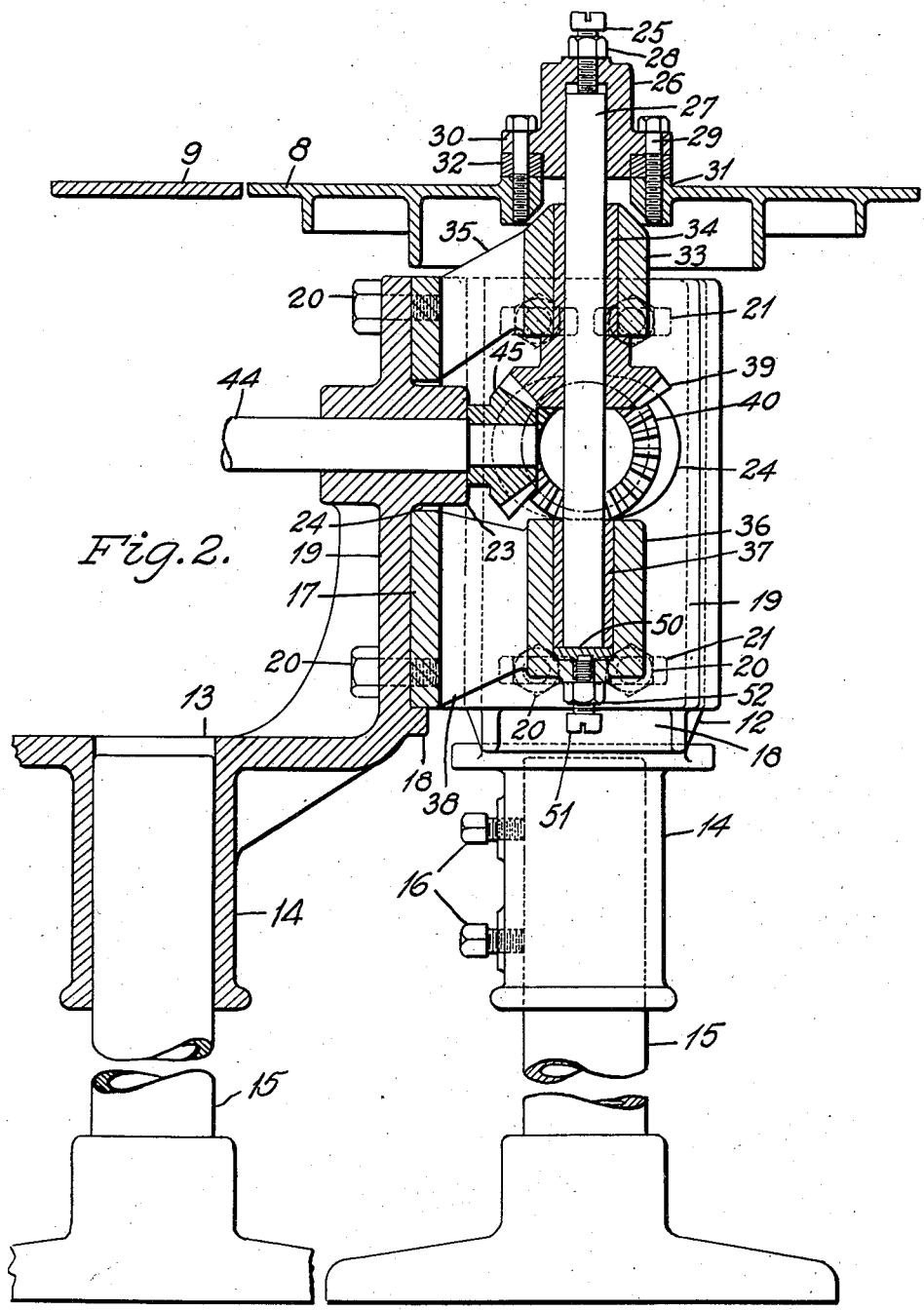

1,524,641

UNITED STATES PATENT OFFICE.

WILBUR S. MAYERS, OF FAIRMONT, WEST VIRGINIA, ASSIGNOR TO MONONGAH GLASS COMPANY, OF FAIRMONT, WEST VIRGINIA, A CORPORATION OF WEST VIRGINIA.

APPARATUS FOR HANDLING GLASSWARE.

Application filed October 10, 1922. Serial No. 593,576.

*To all whom it may concern:*

Be it known that I, WILBUR S. MAYERS, a citizen of United States, residing at Fairmont, in the county of Marion and State of West Virginia, have invented new and useful Improvements in Apparatus for Handling Glassware, of which the following is a specification.

This invention relates to apparatus for handling glassware and has for its object to provide an improved transfer device capable of being adjusted to different heights to correspond to the height of one or more carriers or conveyors with which it is adapted to cooperate in conveying or transferring the ware from one point to another.

A further object of the invention is to provide improved means for effecting angular adjustment between two or more carriers or conveyors, where it is desired to accommodate them to the positions of the glassware shaping machines from which the ware is transferred by the carriers to leers or to other destinations, the carriers operating in conjunction with suitable means for transferring ware from one to the other.

Other objects of the invention will appear from the description to follow.

Preferred constructions and arrangements are shown in the drawings, in which:—

Figure 1 is a plan view with a portion of the transfer table broken away to illustrate the mechanism by which either carrier is made angularly adjustable relative to the other; and Fig. 2 is a sectional elevation on line 2—2 of Fig. 1.

In the apparatus shown, the carrier 7 is adapted to deliver ware to a suitable transfer device, such as the revoluble table 8, which delivers the ware to an adjacent carrier 9, from which the ware may be delivered to a leer, or to any other desired destination.

Adjustable guide plates 10 and 11 are located above the table 8 for deflecting the ware from the carrier 7 to the table and from the table to the carrier 9, the guide plates being held in the desired position of adjustment by any suitable means.

Brackets 12 and 13 are provided for supporting the adjacent ends of the carriers 7 and 9 respectively, the brackets serving also as a support for the transfer table 8, in a manner to be described. The brackets 12 and 13 project outwardly and upwardly from sleeves 14 which are adjustable upon the adjacently mounted standards 15 whereby to regulate the height of the carriers and to adjust them to the same level, the sleeves being held by set screws 16 as shown in Fig. 2.

The brackets 12 and 13 are adapted to jointly support a segment or circular bearing member 17 resting upon the curved lugs 18 of the brackets, said segment serving as a support for the vertically adjustable transfer table 8, in a manner to be described.

The brackets 12 and 13 are each provided with annular portions 19 clamped upon the segment 17 by bolts, or by studs 20 extending through slots 21 in the brackets and threaded into the segment. The brackets are each provided with aligned bearings 22 and 23 for the carrier sprocket shafts, the bearings 23, which project laterally from the annular portions 19 being extended through openings 24 in the segment 17, the openings being elongated enough to permit the desired angular movement of the brackets. Adjustment of either of the carriers angularly with relation to the other may be effected by loosening the studs 20 and moving the carrier to swing the annular portion 19 of the bracket upon the segment 17 the desired amount.

The vertical adjustment of the transfer table 8 to the level of the carrier is effected by turning the adjusting screw 25 threaded through the cap or collar 26 of the table 8 into engagement with the end of the shaft 27, by which the table is supported and driven. The cap 26 is mounted to slide on the shaft and is splined or otherwise held thereon to afford a suitable driving connection for the table. A lock nut 28 serves to retain the screw 25 in the desired position of adjustment. The cap 26 is clamped upon the table 8 by means of screws 29 extending through the flange 30 of the cap and threaded into bosses 31 of the table. A spacing ring 32 of the desired thickness may be interposed between the flange 30 and boss 31 to vary the height of the table and to regulate the clearance between the hub 31 and the shaft bearing 33.

The bearing 33, including the bushing 34 for the shaft 27, is supported by the arms 35 extending radially inward from the segment 17 as shown in Fig. 1. The lower bearing 36 and bushing 37 therefor are supported by the radial arms 38 of the segment. Upon the shaft 27 is suitably secured a bevel gear 39 driven by a similar gear 40 on the inner end of the shaft 41, which is journaled in the bearings 22 and 23 of the bracket 12. The shaft 41 is provided with a sprocket 42 for driving the carrier 7, while the carrier 9 is driven by a sprocket 43 on the shaft 44, which is journaled in the bearings 22 and 23 of the bracket 13. Upon the shaft 44 is a beveled gear 45 meshing with the gear 39 on the shaft 27. It will be seen therefore that the shaft 41 serves to drive both the table 8 and the carrier 9 through the train of gears described above. The shaft 41 is provided with a worm wheel 46 driven by a worm 47 on a driving shaft 48 connected with any suitable source of power. The casing 49 containing the worm wheel is detachably connected with the bracket 12 and may be bolted to either of the brackets 12 or 13, which are made interchangeable.

As a means for taking up wear on the bottom of the shaft 27, and to maintain proper meshing of the bevel gear 39 with the gears 40 and 45, the shaft and its thrust bearing 50 is made vertically adjustable by means of the adjusting screw 51, the screw being held, when properly adjusted, by the lock nut 52.

The carriers may be of any suitable type, preferably of the link-belt type, the links being supported and guided by the plates 53 carried by the angle bars 54, which are suitably connected with the brackets 12 and 13.

The illustrated embodiment of the invention may be modified in construction, arrangement and mode of operation by those skilled in the art, without departing from the scope of the invention, as defined in the appended claims.

I claim:

1. In glassware handling apparatus, a rotatably mounted table, a carrier for delivering ware to the table, a second carrier for receiving the ware from the table, one of said carriers being adjustable angularly with respect to the other, means for actuating said carriers and said table, and means for guiding the ware to and from the table to transfer it off of one carrier and on to the other.

2. In glassware handling apparatus, a rotatably mounted table, a carrier for delivering ware to the table, a second carrier for receiving the ware from the table, one of said carriers being adjustable angularly with respect to the other, means for actuating said carriers and said table, and means for adjusting the table vertically to align it with the carriers.

3. In glassware handling apparatus, the combination of angularly disposed carriers, supporting members for the carriers, a table for transferring ware from one of said carriers to the other, a support for the table carried by said supporting members, one of said members being adjustable upon the support around the axial center of the table, whereby to vary the angle between the carriers, and means for actuating said table and said carriers.

4. In glassware handling apparatus, the combination of angularly disposed carriers, supporting brackets for the carriers, a table for transferring ware from one of the carriers to the other, a support for the table carried by said brackets, one of the brackets being adjustable upon said support whereby to vary the angle between said carriers, means for driving one of the carriers, and means connected therewith for driving the table and the other carrier.

5. In glassware handling apparatus, the combination of angularly disposed carriers, supporting brackets for the carriers, a table for transferring ware from one of the carriers to the other, a support for the table carried by said brackets, one of the brackets being adjustable upon said support, whereby to vary the angle between said carriers, means for driving one of the carriers, and means connected therewith for driving the table and the other carrier, and means for adjusting the table vertically to align it with the carriers.

6. In glassware handling apparatus, the combination of angularly disposed carriers, supporting brackets for the adjacent ends of the carriers, a table for transferring ware from one of the carriers to the other, a support for the table carried by said brackets, one of the brackets being adjustable upon the support, whereby to vary the angle between said carriers, a shaft journaled upon each of said brackets for driving the carrier supported thereby, a shaft journaled upon said support for driving said table, and gears connecting said shafts whereby one of the carrier shafts serves to drive the table and the other carrier.

7. In glassware handling apparatus, a plurality of carriers angularly disposed relative to each other, a table mounted between said carriers adapted to deliver ware from one to the other, a segmental support for the table, a bracket support for one of said carriers adjustable upon the segmental support to permit angular adjustment of said carriers about a common center, and means for driving said table and said carriers.

8. In glassware handling apparatus, a plurality of carriers angularly disposed relative to each other, a table mounted between said carriers adapted to deliver ware from one to the other, a segment upon which the table is rotatably mounted, a supporting bracket for each of said carriers, said brackets each being mounted to swing upon the segment to permit angular adjustment of either carrier relative to the other, and means for driving said carriers and said table.

WILBUR S. MAYERS.